Oct. 18, 1949.　　P. P. SOMERVILLE　　2,485,019
LUBRICATED WIRE ROPE
Filed March 28, 1947
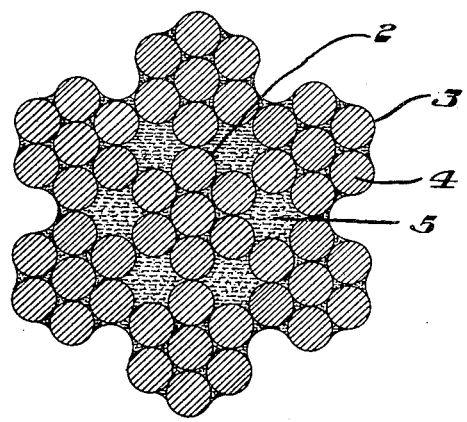
INVENTOR
PETER P. SOMERVILLE

UNITED STATES PATENT OFFICE 2,485,019

LUBRICATED WIRE ROPE

Peter P. Somerville, Muncy, Pa., assignor to Jones & Laughlin Steel Corporation, Pittsburgh, Pa., a corporation of Pennsylvania Application March 28, 1947, Serial No. 737,997

8 Claims. (Cl. 57—153)

This invention relates to lubricated wire rope. It relates particularly to lubricated wire rope having superior antifriction properties and adapted for use under extreme loading conditions.

It is customary to lubricate wire rope with a lubricant such as a heavy oil or grease which has satisfactory lubricating properties under ordinary loading conditions but which under extreme loading conditions to a large extent loses its lubricating characteristics. This results in unequal strain upon the wire rope elements with consequent increased danger of failure and impairment of uniform flexibility of the rope in all directions.

I provide a lubricated wire rope overcoming the disadvantages above mentioned and which is especially adaptable for use under extreme loading conditions. I lubricate wire rope with a lubricant comprising an oleaginous carrier containing powdered bearing metal. The carrier, while ordinarily a petroleum grease, may be any mineral, vegetable or animal oil or grease having requisite lubricating characteristics. The powdered bearing metal may be any bearing metal reduced to powdered form. I have found powdered bronze to be well adapted for incorporation with a carrier to form a lubricant for the lubrication of wire rope. However, other powdered bearing metals may be employed, as, for example, zinc and aluminum. For certain uses it is desirable to employ a powdered bearing metal having a corrosion inhibiting action relatively to the metal of the wire rope. For example, if strands of the wire rope comprise steel wire the bearing metal selected is preferably above iron in the electromotive force series of metals so that when the rope is operated in electrolytic solutions such as salty water or in corrosive atmospheres the steel will be protected against corrosion.

The wire rope may be constructed in any desired or conventional manner. The structure of the wire rope does not constitute the invention, which resides in the incorporation in wire rope of a particular lubricant. The wire rope may, for example, have a central strand and surrounding strands wound about the central strand in known manner. Certain of the strands may be of fibrous or other non-metallic material or may contain fibrous or other non-metallic material, as well known in the art. Certain of the strands comprise metallic wire. Strands may be formed of wires wound together, as, for example, steel wires wound together.

The lubricant covers the strands of the rope to lubricate them with respect to one another and to externally lubricate the rope. It also covers the wires of strands which comprise wires and lubricates the wires with respect to one another.

When the rope is heavily loaded the metallic particles between the wires and strands impart antifriction properties not obtained at high pressures employing ordinary lubricants. Under extreme loading conditions the bearing metal particles may flow on the contacting surfaces of the strands or wires and may produce a plating effect which additionally enhances the antifriction properties and lubricating efficiency of the lubricant. Under all loading conditions, and particularly under extreme loading conditions, the respective wires and strands are effectively lubricated with respect to one another to permit proper relative movement therebetween whereby stresses and strains in the respective wires and strands are equalized, thus minimizing the danger of failure and increasing the life of the rope. The flexibility or bendability of the rope is maintained uniform in all directions and under extreme loading conditions the rope operates in a superior manner over sheaves and drums.

The lubricant may be applied to the rope in any desired or well known manner. The manner of application of the lubricant does not constitute the present invention. Desirably the lubricant is introduced between the individual wires in forming the strands and between the individual strands in forming the rope and on the outsides of the wires, strands and rope. This may be done, for example, by stuffing and coating, using conventional methods. To prevent settling out of the particles of metal and to insure uniform distribution of the metal in the carrier it is desirable to continually agitate or stir the lubricant during application.

In the accompany drawing I have illustrated in cross-section a lubricated wire rope employing my invention. The rope shown has a central strand 2 and six surrounding strands 3. Each strand consists of six wires 4. Each wire 4 may be a single wire or it in turn may be made up of a plurality of smaller wires wound together.

The drawing is purely for the purpose of diagrammatically illustrating the employment of my lubricant in a wire rope; the form of the wire rope may vary—indeed my lubricant may be applied to any wire rope. The lubricant is designated by reference numeral 5 and covers the strands of the rope to lubricate them with respect to one another and to externally lubricate the rope. The lubricant also covers the wires of the strands and lubricates the wires with respect to one another as shown in the drawing.

While I have shown and described certain present preferred embodiments of the invention it is to be distinctly understood that the invention is not limited thereto but may be otherwise variously embodied within the scope of the following claims.

I claim:

1. Lubricated wire rope comprising strands wound together and lubricant comprising an oleaginous carrier containing powdered bearing metal covering the strands to lubricate them with respect to one another and to externally lubricate the rope.

2. Lubricated wire rope comprising strands wound together, at least certain of the strands comprising wires wound together, and lubricant comprising an oleaginous carrier containing powdered bearing metal covering the wires and strands to lubricate the wires with respect to one another and to lubricate the strands with respect to one another and to externally lubricate the rope.

3. Lubricated wire rope comprising strands wound together and lubricant comprising an oleaginous carrier containing powdered bronze covering the strands to lubricate them with respect to one another and to externally lubricate the rope.

4. Lubricated wire rope comprising strands wound together and lubricant comprising an oleaginous carrier containing powdered zinc covering the strands to lubricate them with respect to one another and to externally lubricate the rope.

5. Lubricated wire rope comprising strands wound together, at least certain of the strands comprising steel wire, and lubricant comprising an oleaginous carrier containing powdered bearing metal having a corrosion inhibiting action relatively to the steel covering the strands to lubricate them with respect to one another and to externally lubricate the rope.

6. Lubricated wire rope comprising strands wound together, at least certain of the strands comprising steel wire, and lubricant comprising an oleaginous carrier containing powdered bearing metal above iron in the electromotive force series of metals covering the strands to lubricate them with respect to one another and to externally lubricate the rope.

7. Lubricated wire rope comprising strands wound together, at least certain of the strands comprising steel wires wound together, and lubricant comprising an oleaginous carrier containing powdered bearing metal above iron in the electromotive force series of metals covering the wires and strands to lubricate the wires with respect to one another and to lubricate the strands with respect to one another and to externally lubricate the rope.

8. Lubricated wire rope comprising strands wound together, at least certain of the strands comprising steel wires wound together, and lubricant comprising an oleaginous carrier containing powdered bronze covering the wires and strands to lubricate the wires with respect to one another and to lubricate the strands with respect to one another and to externally lubricate the rope.

PETER P. SOMERVILLE.

REFERENCES CITED

The following references are of record in the file of this patent:

UNITED STATES PATENTS

| Number | Name | Date |
|---|---|---|
| 1,730,741 | Munford | Oct. 8, 1929 |
| 2,148,945 | Hoedemaker | Feb. 28, 1939 |
| 2,183,336 | Miller | Dec. 12, 1939 |
| 2,372,142 | Warren | Mar. 20, 1945 |

FOREIGN PATENTS

| Number | Country | Date |
|---|---|---|
| 104,231 | Australia | Mar. 30, 1937 |

OTHER REFERENCES

Vickers: Metals and Their Alloys, published by Henry C. Baird & Co., New York, N. Y., 1923. Copy in Scientific Library.